United States Patent
Chen et al.

(10) Patent No.: US 9,614,442 B2
(45) Date of Patent: Apr. 4, 2017

(54) MODULAR DC-DC CONVERTER INCLUDING A DC TRANSFORMER MODULE

(71) Applicant: The Regents of the University of Colorado, Boulder, CO (US)

(72) Inventors: Hua Chen, Boulder, CO (US); Robert Warren Erickson, Jr., Boulder, CO (US); Dragan Maksimovic, Boulder, CO (US); Tadakazu Harada, Boulder, CO (US)

(73) Assignee: The Regents of the University of Colorado, A Body Corporate, Denver, CO (US)

( * ) Notice: Subject to any disclaimer, the term of this patent is extended or adjusted under 35 U.S.C. 154(b) by 0 days.

(21) Appl. No.: 14/689,023

(22) Filed: Apr. 16, 2015

(65) Prior Publication Data
US 2015/0303815 A1 Oct. 22, 2015

Related U.S. Application Data

(60) Provisional application No. 61/980,419, filed on Apr. 16, 2014.

(51) Int. Cl.
*H02M 3/158* (2006.01)
*H02M 1/00* (2006.01)

(52) U.S. Cl.
CPC .......... *H02M 3/158* (2013.01); *H02M 3/1582* (2013.01); *H02M 2001/0054* (2013.01); *H02M 2001/0077* (2013.01); *Y02B 70/1491* (2013.01)

(58) Field of Classification Search
CPC ............ H02M 3/335; H02M 3/33507; H02M 3/33546; H02M 3/33569; H02M 3/158; H02M 3/1582; H02M 2001/0077
(Continued)

(56) References Cited

U.S. PATENT DOCUMENTS

| 7,619,323 | B2 * | 11/2009 | Tan ........................... H02J 1/10 307/82 |
| 2007/0247004 | A1 | 10/2007 | Tan et al. |

(Continued)

FOREIGN PATENT DOCUMENTS

CN 101834539 A 9/2010

OTHER PUBLICATIONS

International Searching Authority/US Search Report and Written Opinion mailed Jul. 21, 2015 in reference to co-pending International Application No. PCT/US2015/026265 filed Apr. 16, 2015 (18 pages).

*Primary Examiner* — Yemane Mehari
(74) *Attorney, Agent, or Firm* — Dinsmore & Shohl LLP

(57) ABSTRACT

A modular dc-dc boost converter system is provided that can substantially improve efficiency over a wide range of input and output voltages. The system includes three modules: a buck module, a boost module, and a dc transformer module. These modules are interconnected such that the system output voltage is equal to the sum of the output voltages of a dc-dc converter module and a dc transformer module. Depending on the operating point, one or more modules may operate in passthrough mode, leading to substantially reduced ac losses. The required capacitor size and the transistor voltage ratings are also substantially reduced, relative to a conventional single dc-dc boost converter operating at the same input and output voltages.

13 Claims, 11 Drawing Sheets

(58) Field of Classification Search
USPC .......... 363/21.01–21.18; 323/259, 282, 283; 307/82
See application file for complete search history.

(56) References Cited

U.S. PATENT DOCUMENTS

| | | |
|---|---|---|
| 2009/0102449 A1 | 4/2009 | Chang et al. |
| 2009/0244944 A1 | 10/2009 | Jang et al. |
| 2011/0273911 A1 | 11/2011 | Torrico-Bascop et al. |
| 2011/0292688 A1 | 12/2011 | Zhang et al. |
| 2012/0042588 A1* | 2/2012 | Erickson, Jr. ..... H01L 31/02021 52/173.3 |
| 2012/0051097 A1 | 3/2012 | Zhang et al. |
| 2012/0092905 A1 | 4/2012 | Srighakollapu et al. |
| 2013/0027981 A1 | 1/2013 | Liu et al. |

* cited by examiner

MODULAR DC-DC CONVERTER INCLUDING A DC TRANSFORMER MODULE

FIELD

The present disclosure relates to DC-DC power conversion that incorporating a DC transformer and converts an input voltage to an output voltage.

BACKGROUND

A modular dc-dc conversion system to boost a voltage is disclosed in the following patent application:
  Robert Erickson, "Integrated Photovoltaic Module" U.S. patent application Ser. No. 13/318,589, May 10, 2010, which is incorporated by reference herein in its entirety as if fully set forth herein.
The approach in this reference provides a non-inverting buck-boost converter arranged in series with a unidirectional DC transformer (DCX) module. The reference does not disclose a DCX module whose output port is connected in series with the output of a converter module, such as a boost module.

A publication that provides a detailed analysis of a DC transformer circuit, such as the DCX circuit shown in FIG. 8, including design information, is the following:
  D. Jones and R. Erickson, "Analysis of Switching Circuits through Incorporation of a Generalized Diode Reverse Recovery Model into State Plane Analysis," IEEE Transactions on Circuits and Systems I, vol. 60, no. 2, pp. 479-490, February 2013, which is incorporated by reference herein in its entirety as if fully set forth herein.

A publication that describes a method for controlling buck and boost converters using pass-through modes is the following:
  D. Jones and R. Erickson, "A Nonlinear State Machine for Dead Zone Avoidance and Mitigation in a Synchronous Noninverting Buck-Boost Converter," IEEE Transactions on Power Electronics, vol. 28, no. 1, pp. 467-480, January 2013, which is incorporated by reference herein in its entirety as if fully set forth herein.

A DC-DC boost converter increases a DC input voltage $V_{in}$ to produce a DC output voltage $V_{out}=MV_{in}$, where the conversion ratio M is greater than or equal to one. An example of a well-known implementation of a boost converter 10 is illustrated in FIG. 1. In this circuit 10, a controller circuit drives a transistor gate 12 with a repetitive signal that causes the transistor Q to be ON for a time $DT_s$, and OFF for a time $(1-D)T_s$, where D is the transistor duty cycle and $T_s$ is the switching period. When the transistor Q is ON, energy from an input source is stored in the inductor L. When the transistor Q is OFF, the diode D becomes forward-biased by an inductor current, and energy stored in the inductor L is released to the output. To the extent that the circuit elements have low power loss, the output voltage is given by $V_{out}=V_{in}/(1-D)$, and the efficiency $\eta=P_{out}/P_{in}$ can approach 100%. A bi-directional converter 20 that is an extension of the conventional DC-DC boost converter is illustrated in FIG. 2, in which a pair of transistors Q1 and Q2 and a pair of diodes D1 and D2 allow the inductor current to be either positive or negative, so that power can flow from either $V_{in}$ to $V_{out}$ or $V_{out}$ to $V_{in}$.

It is well known that a variety of loss mechanisms reduce the efficiency of the boost converters of FIG. 1 and FIG. 2. These loss mechanisms can be broadly grouped into DC losses and AC losses. In this disclosure, DC losses refer to losses that do not depend directly on the switching frequency, such as losses arising from the forward voltage drops of the semiconductor devices and losses caused by the DC resistance of the inductor winding. AC losses refer to losses that increase with switching frequency, such as semiconductor switching losses caused by transistor and diode switching times, diode reverse recovery, semiconductor output capacitances, and transistor drive power. The inductor also exhibits AC losses caused by core loss as well as AC winding losses arising from the skin and proximity effects. As a result of these loss mechanisms, the conventional boost converter circuit may exhibit substantially degraded efficiency. Furthermore, the efficiency is a function of input and output voltage, switching frequency, and output power. FIG. 3 illustrates typical efficiency curves of a boost converter, for several values of resistive load. It can be seen that the efficiency degrades as the duty cycle (and hence also output voltage) is increased.

Typically, power converters are thermally limited by their cooling systems, and these cooling systems may have significant size and cost. For a given cooling technology and cooling system size, there is a fixed amount of loss that can be tolerated while maintaining an acceptable temperature rise. In a thermally limited system, improvement of efficiency means that the output power can be increased. For example, if the efficiency can be increased from 96% to 98%, then the loss is approximately halved. Assuming that the system is still thermally-limited and the cooling system size is maintained constant, then the rated output power can be doubled and the cost per watt of output power is halved. Ultimately, it is desirable to increase the ratio $P_{out}/P_{loss}$ so that the converter cost per watt, or cooling system size and cost, are decreased.

A conventional boost converter also exhibits reduced efficiency at low output power, as a result of AC losses. Converter efficiency over a range of output powers and voltages is increasingly important because the converter may operate at partial power for a substantial fraction of the time. For example, power converters for solar power systems are characterized by a weighted efficiency that accounts for efficiency not only at rated power, but also at lower powers corresponding to less than full irradiance. Power converters for electric vehicle applications must operate over driving profiles having a wide variety of speeds and accelerations, corresponding to a variety of converter output voltages and powers; improvement of efficiency at all of these operating points is needed to improve the effective miles per gallon (MPGe) of the vehicle. Power converters for grid interface of wind turbines must also operate efficiently with a wide range of voltages and output powers, corresponding to a range of wind speeds. FIG. 4 illustrates a typical efficiency curve for a conventional boost converter, operating at a constant output voltage and with variable output power. It is desirable to increase the efficiency not just at maximum power, but also at lower powers.

AC switching losses can be reduced by reduction of the switching frequency. However, this necessitates use of larger inductor and capacitor elements, which are more expensive. The larger inductor may also exhibit higher DC resistance. Therefore, it is often undesirable to reduce the switching frequency, and solutions are needed that achieve high efficiency without sacrificing switching frequency.

The size of the output capacitor is often limited by its root-mean-square (RMS) current rating. The RMS capacitor current increases as the duty cycle is increased. To reduce the size and cost of this capacitor, an improved circuit is needed that can boost the voltage substantially, while maintaining relatively low RMS capacitor current.

High-voltage power semiconductor devices typically exhibit increased switching times and increased switching losses. In a boost converter system, for example, it may be desirable to avoid use of high-voltage semiconductor devices, employing multiple lower-voltage devices instead. A well-known example of this is a multilevel converter; a three-level boost converter is illustrated in FIG. 5. This converter circuit 30 can achieve some of the goals delineated here, including reduction of AC losses and use of semiconductors with reduced voltage rating. However, it operates with substantially increased capacitor RMS currents, and hence requires expensive capacitors.

SUMMARY

In various implementations, for example, a modular DC-DC converter is provided that employs semiconductors with reduced voltage ratings, while also reducing the capacitor RMS currents.

In one implementation, DC-DC power conversion incorporating a DC transformer that converts an input voltage to an output voltage is provided. In various implementations, a modular DC-DC power conversion is provided to improve converter efficiency over a wide range of conversion ratios and output powers. In one particular implementation, a modular architecture includes a DC transformer (DCX) module and at least one converter module capable of being operated in a pass-through mode. For example, a modular architecture may include a DC transformer module and at least one of a boost converter module, a buck converter module and a non-inverting buck-boost converter module. The modules may be configured as and controlled such that efficiency is improved.

In one implementation, a boost DC-DC converter improves the efficiency of a DC-DC boost converter system, through reduction of the AC losses; improves converter efficiency over a range of operating points, i.e., a range of conversion ratios and output powers; reduces capacitor size, through reduction of the RMS capacitor current(s); and/or employs semiconductor power devices having reduced voltage ratings and better performance.

In various implementations, a modular DC-DC boost converter architecture employs partial-power modules performing DC transformer (DCX), buck, and boost functions. These modules are able to operate with ultra-high efficiency over a restricted range of operating points, and are combined into a system architecture that performs the required DC-DC boost conversion function. The DCX module, for example, is able to perform an isolated boost function at a fixed conversion ratio, with very high efficiency. Boost and buck modules may operate with a restricted range of conversion ratios where their efficiency is very high and where the capacitor current stresses and inductor applied ac voltages are substantially reduced. Voltage sharing between modules allows use of lower-voltage semiconductor devices having better characteristics, and also reduces AC losses. One or more controllers may command the switching of the semiconductor devices of the modules. These controller(s) may employ pass-through modes, in which one or more modules simply connect their input and output ports to achieve a conversion ratio of unity; this improves efficiency by eliminating the AC loss of the module(s). The AC loss of the overall system is reduced, and hence the efficiency is increased over a range of output voltages and powers.

BRIEF DESCRIPTION OF THE DRAWINGS

For a more complete understanding of the invention, reference is made to the following description and accompanying drawings, in which.

DETAILED DESCRIPTION

Figure 6B:
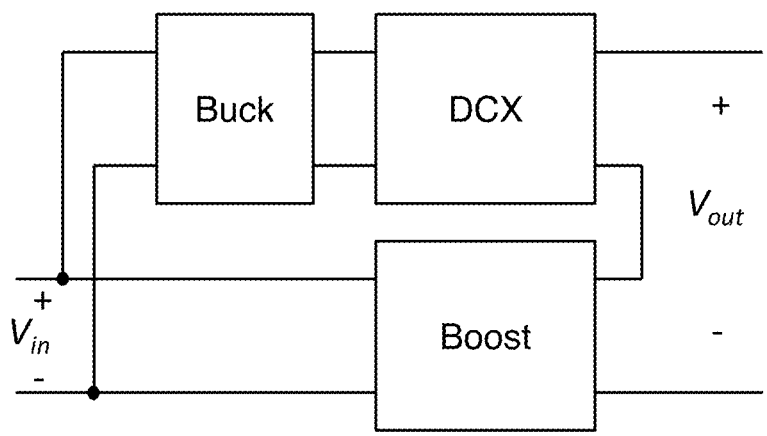
FIGS. 6A and 6B include block diagrams of an example modular DC-DC converters.
Figure 6A:
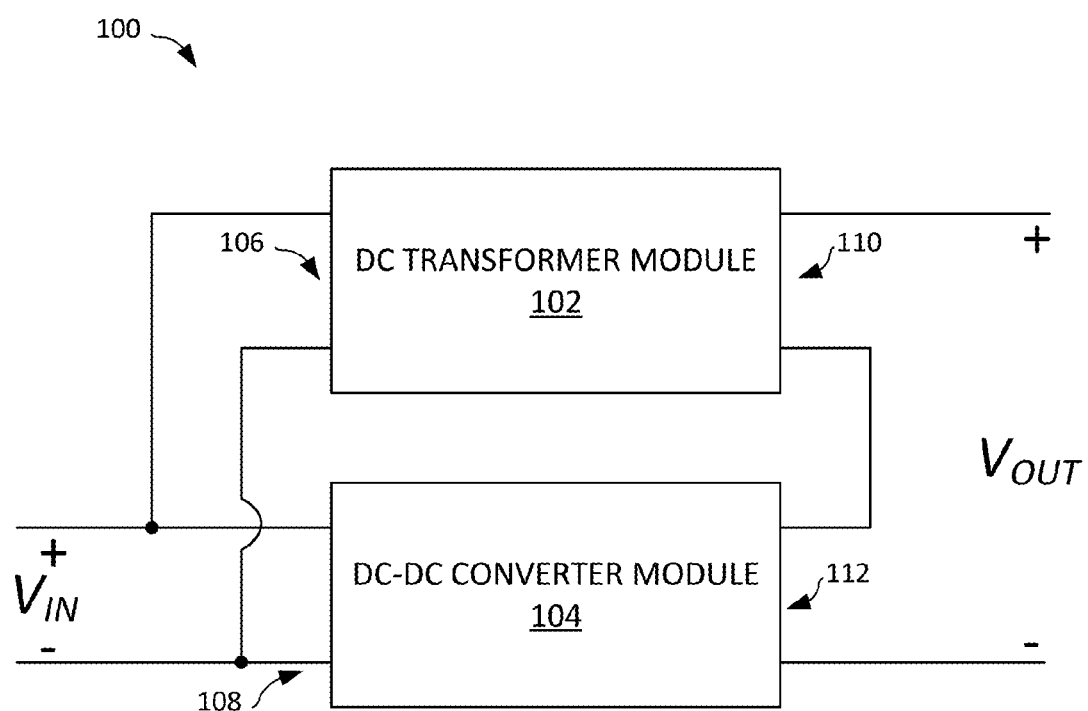

An example implementation of a modular DC-DC converter 100 architecture is illustrated in FIG. 6A. In this particular implementation, a DC transformer module 102, DCX module 102, is provided in a stacked configuration with a DC-DC converter module 104 capable of operating in a pass-through mode. The DC-DC converter module 104 may, for example, include one or more of a Buck DC-DC converter module, a Boost DC-DC converter module, a non-inverting Buck-Boost DC-DC converter module or any other type of converter module capable of being operated in a pass-through mode.

The implementation of FIG. 6A includes the DCX module 102 and the DC-DC converter module 104 arranged in such that the input ports 106, 108 of the DCX module 102 and the DC-DC converter module 104, respectively, are each coupled to an input voltage $V_{in}$. An output port 110 of the DCX module 102 is coupled in series with an output port 112 of the DC-DC converter module 104. In this manner, an output voltage of the modular DC-DC converter 100 is a sum of the individual output voltages $V_{DCXout}$ of the DCX module 102 and $V_{DC-DCout}$ of the DC-DC converter 104.

Figure 1:
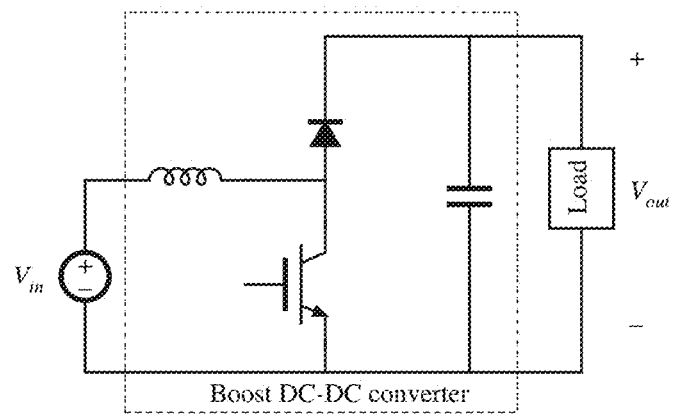
FIG. 1 is an example boost converter with unidirectional power flow.
Figure 2:
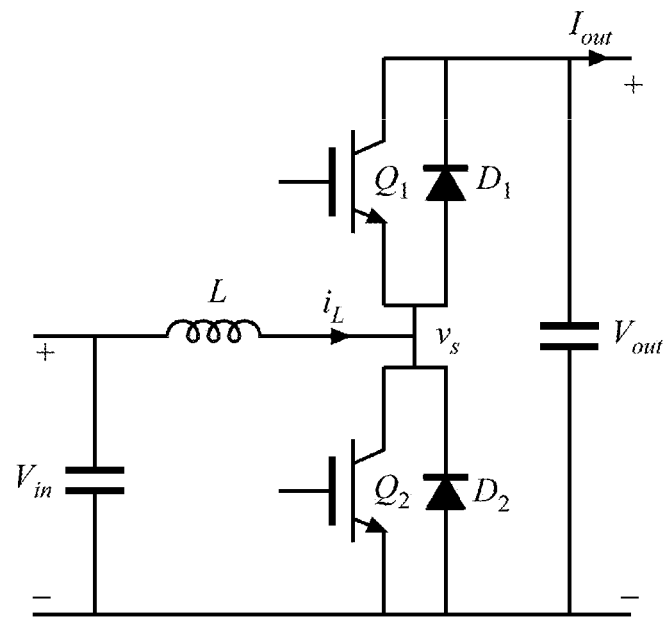
FIG. 2 is an example boost converter with bidirectional power flow.
Figure 3:
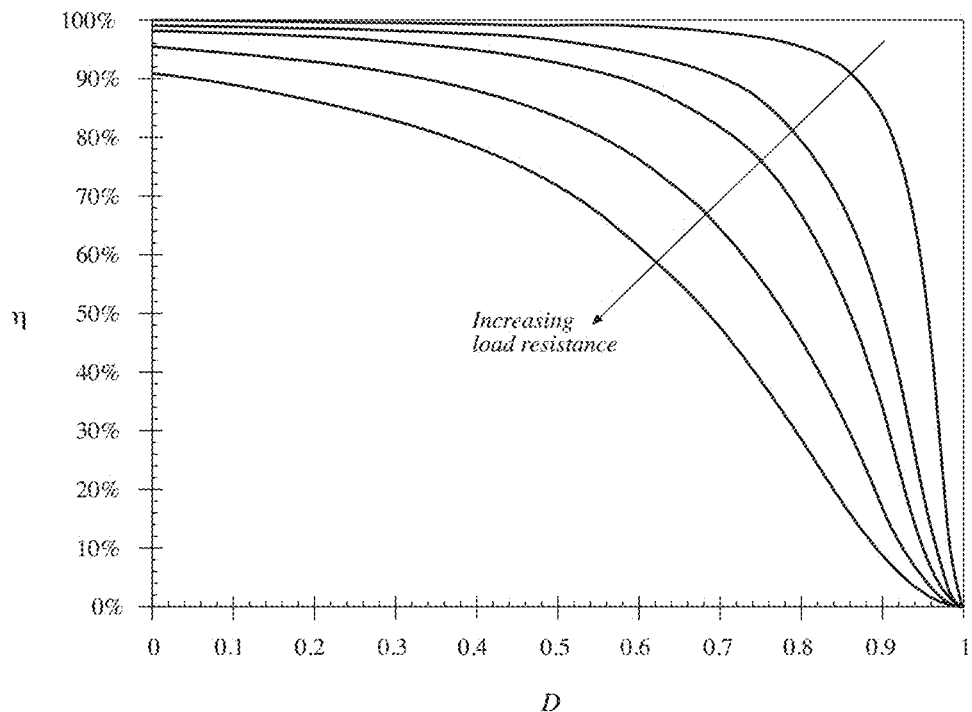
FIG. 3 is a typical plot of efficiency vs. duty cycle for a prior art boost converter.
Figure 4:
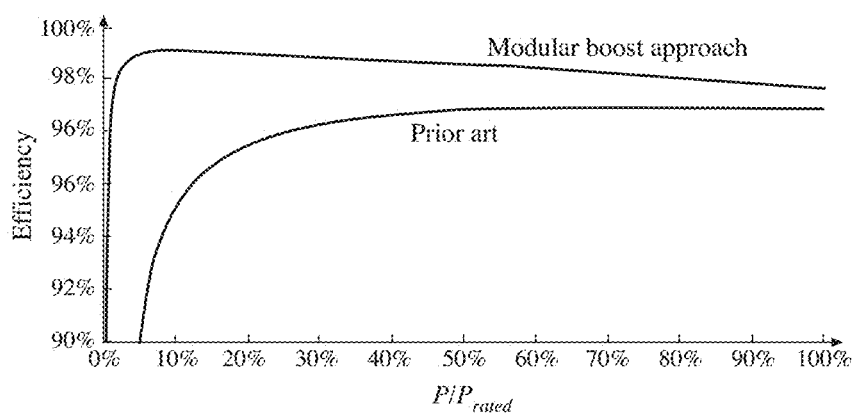
FIG. 4 is a typical plot of efficiency vs. output power, for a fixed output voltage, for a prior art boost converter and also for an example implementation of a boost converter provided herein.
Figure 5:
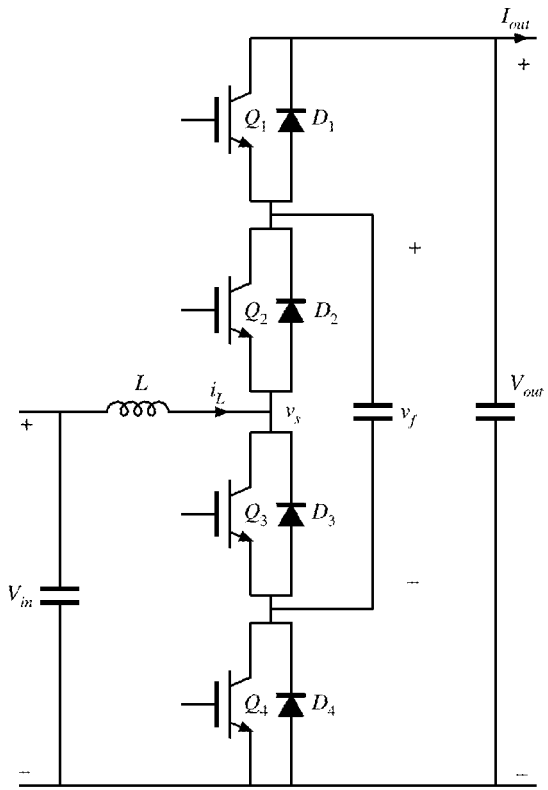
FIG. 5 is an example three-level boost converter.

Another example implementation of a modular DC-DC boost converter architecture 120 is illustrated in FIG. 6B. With this approach, several partial-power converter modules 122, 124 and 126 are combined such that the system efficiency is optimized over a range of voltage and power operating points. By control of the modules 122, 124 and 126, the efficiency over the given range can be substantially higher than in a conventional full-power boost approach. In addition, the modules can share the voltage stresses, allowing lower-voltage semiconductor devices to be employed. Additionally, the choice of module types affects the sizes of the magnetic and capacitive elements of the system; the architecture allows the capacitive elements to be much smaller than in competing approaches such as the multilevel boost architecture of FIG. 5.

FIG. 6B illustrates another example modular dc-dc converter system 120 including two DC-DC converter modules 122, 126 and a DC transformer module 124. In this implementation, the first DC-DC converter module 122 is a buck converter module 122, and the second DC-DC converter module 126 is a boost converter module 126. This particular arrangement of the implementation shown in FIG. 6B is, however, merely an example implementation. The individual DC-DC converter modules (buck 122 and boost 126) or DC transformer module 124 may be arranged in other orders or may include other types of modules. Each of the DC-DC converter modules 122 and 126, for example, may include at least one or a buck converter module, a boost converter module, a non-inverting buck-boost converter module or any other type of DC-DC converter module capable of operating in a pass-through mode.

In the particular implementation shown in FIG. 6B, for example, the first DC-DC converter module 126 and the DC transformer module 124 are coupled in series along a first, upper branch of the modular DC-DC converter 120 and the second DC-DC converter module 126 is arranged along a second, lower branch of the modular DC-DC converter 120. An input port 128, in this case including two input terminals, of the first DC-DC converter module 122 is coupled in parallel with an input port 136 of the second DC-DC converter module 126 and the input ports are coupled to an input voltage Vin of the modular DC-DC converter 120. An output port 130 of the first DC-DC converter module 122 is coupled to an input port 132 of the DC transformer module 124. An output port 134 is coupled in series with an output port 138 of the second DC-DC converter module 126. The output voltage Vout of the modular DC-DC converter module 120, thus, is a sum of the output voltages of the DC transformer module 124 and the second DC-DC converter module 126.

Figure 7:
FIG. 7 is an representation of an example DC transformer module.
Figure 8A:
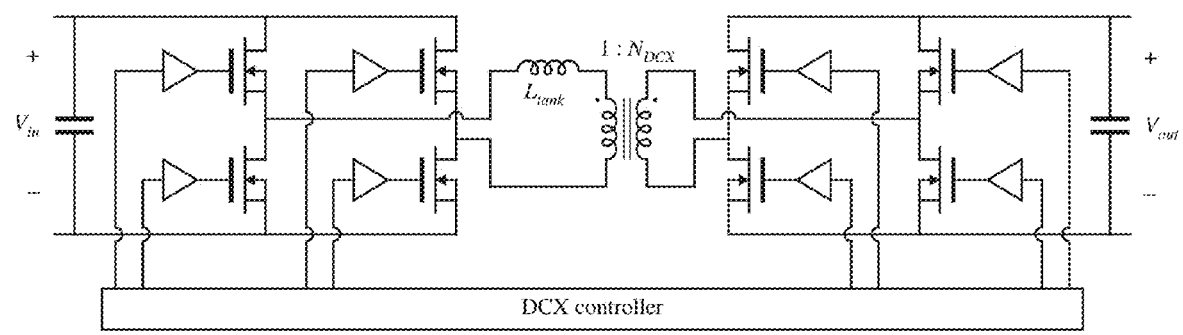
FIGS. 8A and 8B and 8C include schematic diagrams of example DC transformer modules.
Figure 9:
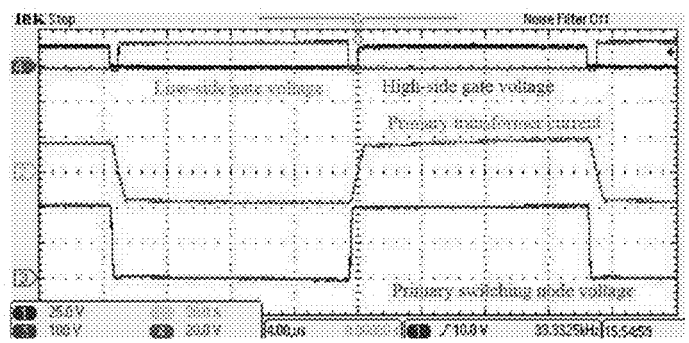
FIG. 9 illustrates example DCX waveforms.

In one implementation of a DC Transformer (DCX) module 140 illustrated in FIG. 7 is a zero-voltage switching DC-DC converter circuit containing a conventional (inductive) transformer. In this implementation, this circuit is optimized to achieve a very high efficiency at a single voltage conversion ratio $V_{DCX-out}/V_{DCX-in}=N_{DCX}$. The input and output terminals are isolated. This type of circuit is generally not able to control its voltage conversion ratio. One well-known DCX circuit is the Dual Active Bridge converter 150, illustrated in FIG. 8. This circuit 150 is capable of bidirectional power flow, and it achieves zero-voltage switching of the power semiconductors on the primary and secondary sides of a transformer 154 through addition of a small tank inductor Ltank. The transformer physical turns ratio is approximately the same as the conversion ratio $N_{DCX}$ defined above. In an exemplary realization, the DCX module of FIG. 6B is realized using the dual-active bridge circuit of FIG. 8, with typical waveforms as illustrated in FIG. 9. This schematic illustrates use of power MOSFETs 152 in full-bridge configurations on the primary and secondary sides of the transformer. These MOSFETs 152 include built-in body diodes, and are driven by gate driver circuits 154. A DCX controller 158 produces control signals that command the gate drivers to turn the MOSFETs 152 on and off. Each MOSFET 152 conducts with a duty cycle of approximately 50%, except for a small dead time inserted by the DCX controller to ensure that the series-connected upper and lower MOSFETs 152 do not simultaneously conduct. FIG. 9 shows typical measured waveforms: the two upper traces are gate drive signals for a pair of series-connected upper and lower MOSFETs 152. Each MOSFET 152 conducts when its gate drive signal is high, and the dead time where both gate drive signals are low can be seen in the figure. Also shown in FIG. 9 (middle trace) is an example transformer primary winding current waveform. At a selected value of output current, this transformer winding current waveform is nearly trapezoidal, with peak value only slightly greater than the dc current. The lower trace in this example is the approximately 50% duty cycle voltage waveform observed at the switch node between the series-connected upper and lower MOSFETs. The voltage waveforms at the other three switch nodes are similar. For this discussion, it is assumed that the DCX module operates with a conversion ratio that is fixed and equal to $N_{DCX}$. Alternatively, the controller can turn the DCX module off, with the input and output terminals operated as short circuits or as open circuits.

Figure 8B:
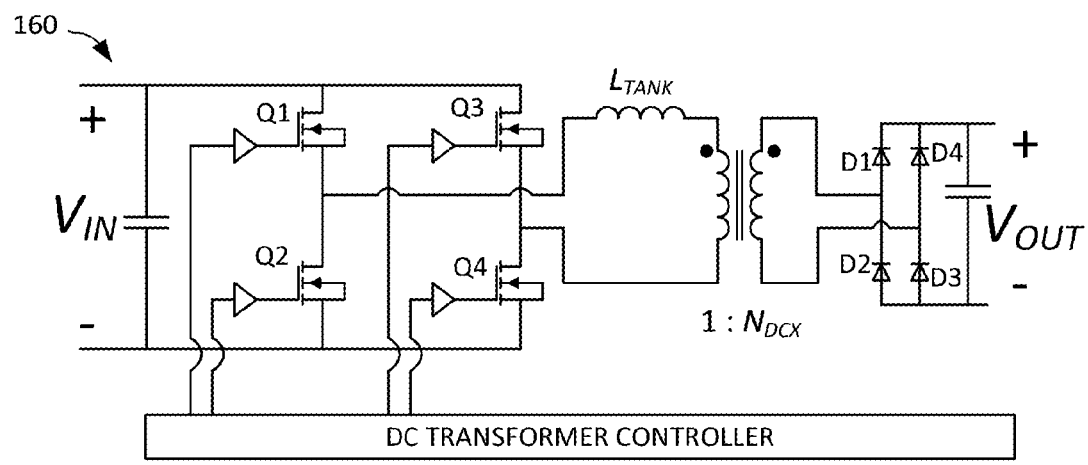
Figure 8C:
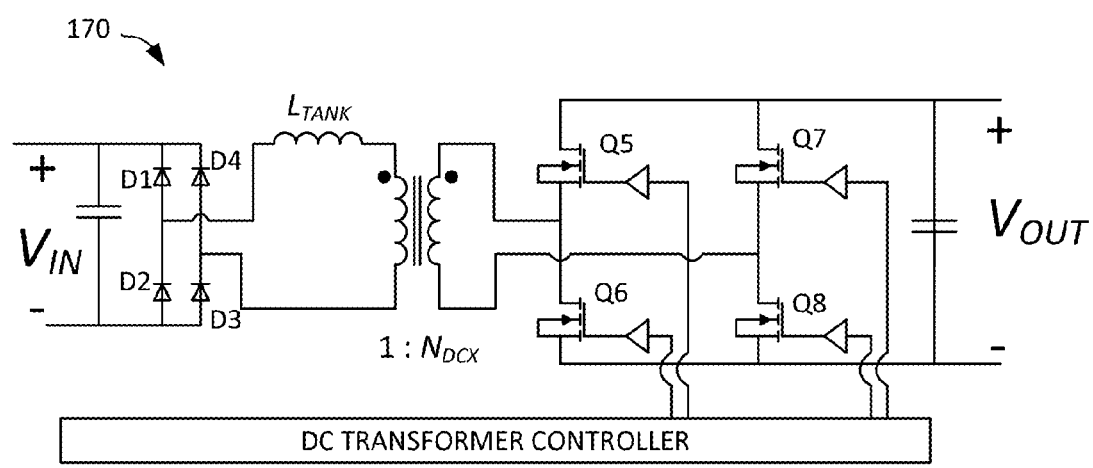

Other example implementations of DC transformer (DCX) transformer modules 160, 170 are illustrated in FIGS. 8B and 8C, respectively. In these implementations, the DCX modules are uni-directional DCX modules in which either the input-side or output-side switches are replaced with diodes D1 through D4 as shown in FIGS. 8B and 8C, respectively. In FIG. 8B, for example, the output-side switches Q5 through Q8 of the dual active bridge converter implementation shown in FIG. 8A are replaced with diodes D1 through D4 and allow the DCX module of FIG. 8B to provide power flow from an input voltage $V_{in}$ side to an output voltage $V_{out}$ side of the DCX module. In the implementation of FIG. 8C, however, switches Q1 through Q4 of the dual active bridge converter implementation shown in FIG. 8A are replaced with diodes D1 through D4. In this implementation, the DCX module provides power flow from an output voltage $V_{out}$ side to an input voltage $V_{in}$ side.

Figure 10:
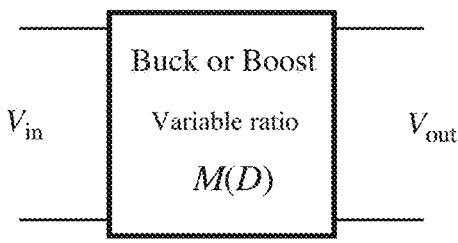
FIG. 10 is a representation of an example buck or boost converter module having conversion ratio M(D)
Figure 11:
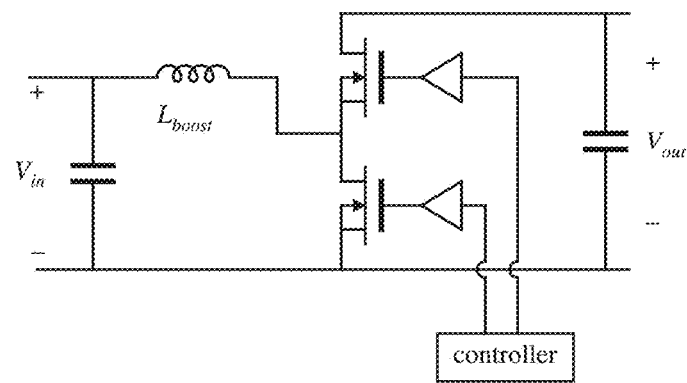
FIG. 11 is a schematic of an example boost converter module with bidirectional power flow.

An example Buck or Boost PWM module 180 illustrated in FIG. 10 is a conventional hard-switched DC-DC converter. A schematic of an example boost converter module 190 is given in FIG. 11. In this example, semiconductor switches are realized using power MOSFET transistors Qt, Q2 having fast recovery body diodes, and power is able to flow in either direction. A controller 192 generates pulse-width modulated (PWM) gate drive signals to control the voltage conversion ratio $M_{boost}(D)=V_{out}/V_{in}=1/(1-D)$ of this module, where D is the duty cycle of the lower MOSFET Q2. The upper MOSFET Q1 is driven with the complement of the gate drive signal applied to the lower MOSFET Q2, with the exception of a small deadtime inserted into the gate drive signals to ensure that the two MOSFETs Q1, Q2 do not simultaneously conduct. In this implementation, the buck module is identical to the boost module, but with the input and output terminals interchanged.

A buck or boost module achieves maximum efficiency in pass-through mode, where the conversion ratio is M(D)=1. This is achieved by causing the high-side semiconductor switch to remain in the on state: D=1 for the buck converter, or D=0 for the boost converter. There is no switching loss in the passthrough mode, and the input is connected to the output through the high-side semiconductor device and the inductor. Very high efficiencies are achieved in passthrough mode. Neighboring operating points, with pulse-width modulation at a duty cycle D near the passthrough value, also achieves high efficiency but with some switching loss. Operation at PWM duty cycles farther from the passthrough value is undesirable because of the increased ac losses in the magnetics, increased ac capacitor currents, and overall reduced efficiency.

Figure 12:
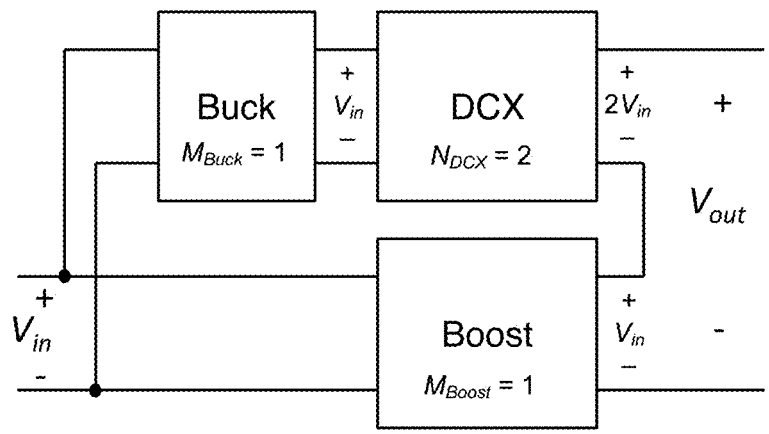
FIG. 12 illustrates a high efficiency operating point having a boost ratio of 3.

To appreciate how the modular boost architecture can improve the efficiency at high output bus voltages, consider the operating point illustrated in FIG. 12. For this example, an overall system conversion ratio is $V_{out}/V_{in}=3$. If a single boost converter were employed in this example, it would operate with a high duty cycle of over 0.7, and would exhibit relatively low efficiency. However, in the modular boost configuration 200, with $N_{DCX}=2$, the buck and boost modules operate in passthrough mode with very high efficiency. The DCX output voltage of $N_{DCX}V_{in}$ is added to the boost output voltage of $V_{in}$, leading to a total dc output voltage of $(1+N_{DCX})V_{in}=3V_{in}$. The system efficiency is very high at this operating point because the buck and boost modules operate in pass-through mode, and the DCX operates with very high efficiency at its optimized conversion ratio of 2. The dc output voltage can be increased by increasing the boost duty cycle, and the dc output voltage can be decreased by decreasing the buck duty cycle.

Figure 13:
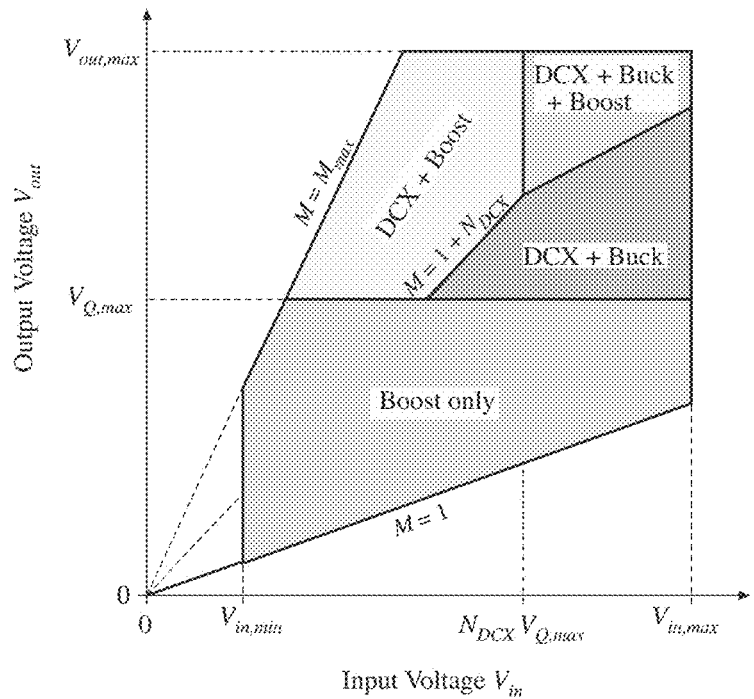
FIG. 13 is a map of various example modes of operation of the DC-DC boost converter shown in FIG. 6B.
Figure 14:
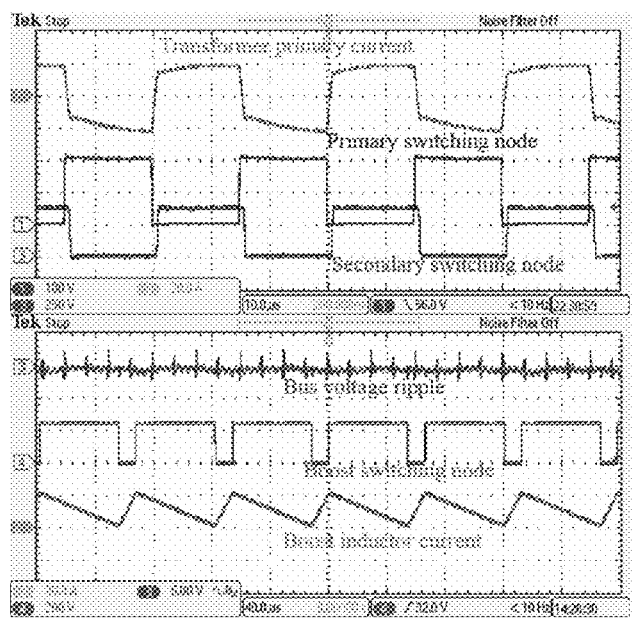
FIG. 14 illustrates example measured module waveforms for operation in the DCX+Boost mode.

FIG. 13 summarizes how the modules may be controlled. In this example, it is assumed that the input voltage can vary over the range $V_{in,min} \leq V_{in} \leq V_{in,max}$, and the output voltage is controlled over the range $V_{in} \leq V_{out} \leq V_{out,max}$. A maximum conversion ratio $M_{max}$ is also assumed. Additionally, the operation modes of FIG. 13 assume that the semiconductor device voltages are constrained to be no greater than $V_{Q,max}$ and this limit is taken to be the maximum allowed voltage at the input or output port of any module. FIG. 13 illustrates four example system operating modes. In the region labeled "DCX+Boost", the buck converter operates in pass-through mode while the boost converter operates with PWM at D>0. The DCX operates, with fixed conversion ratio $N_{DCX}$. In the region labeled "DCX+Buck", the boost converter operates in pass-through mode, while the buck converter operates with PWM at D<1. In the region labeled "DCX Buck Boost", both the buck and the boost converters operate with PWM away from pass-through mode: the buck converter limits its output voltage to approximately $V_{Q,max}/N_{DCX}$, so that the voltage at the DCX output does not exceed $V_{Q,max}$. The boost converter produces a voltage of $(V_{out}-V_{Q,max})$. Finally, for the region labeled "Boost only", the DCX is shut down, with its output-side switches turned on so that the DCX output voltage is zero. The boost converter operates with PWM to produce the required output voltage. Control to implement this strategy is described in a later section of this disclosure.

Thus, in various boost implementations, a modular boost architecture allows substantial improvement of system efficiency over a range of operating points that require substantial boosting of the voltage. The system architecture causes the output dc voltage to be shared between the series-connected DCX and boost modules, reducing the voltage applied to any individual semiconductor switch. Hence, the modules can employ lower-voltage-rated devices having better characteristics. Because of the reduced module voltage and parallel input current paths, the individual modules are rated at a fraction of the total system output power.

EXAMPLE CONTROLLER ARCHITECTURE

A possible control objective in the modular boost dc-dc converter system is to regulate the dc output voltage $V_{out}$ at a reference value set within a controller. In this implementation, the dc output voltage is to be regulated against static and dynamic variations in input voltage $V_{in}$ and the output load current. In a conventional single dc-dc converter system, the voltage regulation feedback loop is relatively simple: the output voltage is sensed and compared to a reference; the error between the sensed bus voltage and the reference is processed by a controller to determine the converter control signal, i.e., the duty cycle of the converter power switches. In a modular dc-dc boost system, the control loop is more complex since power is processed by two, three or more interconnected converter modules. In the implementation of FIG. 6B, for example, one or more controllers control a controller a boost DC-DC converter module, a buck DC-DC converter module, and a DCX module. In one implementation, such as the converter shown in FIG. 6B for example, control signals for the three modules are as follows:

Buck module: buck converter PWM signal with duty cycle $d_{buck}$, $0 \leq d_{buck} \leq 1$, where $d_{buck}=0$ in the shut-down mode, and $d_{buck}=1$ in the pass-through mode;

Boost module: boost converter PWM signal with duty cycle $d_{boost}$, $0 \leq d_{boost} < 1$, where $d_{boost}=0$ in the boost pass-through mode;

DCX module: DCX enable signal that indicates if the DCX module is active or shut down.

Figure 15:
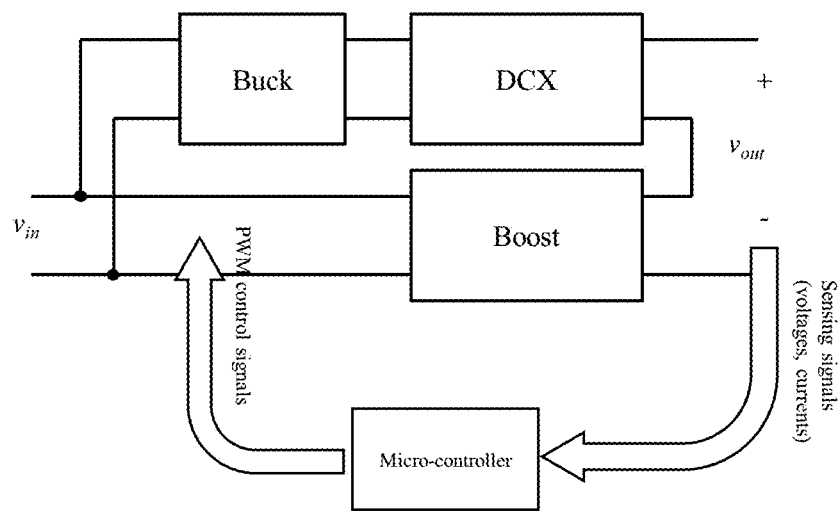
FIG. 15 illustrates an example implementation of control for a modular boost dc-dc system using a microcontroller and sensor signals.

The modular dc-dc boost controller determines and coordinates the module control signals in response to the voltage error signal, as well as in response to the location of the system operating point in the space of input and output voltages. Determination and coordination of the module control signals can be accomplished in a number of ways. This section summarizes a centralized modular dc-dc boost system controller 210 architecture, having the high-level structure illustrated in FIG. 15. Sensed signals (module voltages and currents) are received by a single central controller, in this example, implemented in a microcontroller chip. This microcontroller includes analog-to-digital converters (ADCs) that receive the sensed signals, digital implementation of control algorithms, and PWM outputs that provide the PWM signals listed above: the buck converter PWM signals, boost converter PWM signals, and the DCX module PWM signals including primary and secondary PWM signals that are generated based on the DCX enable signal.

Figure 16:
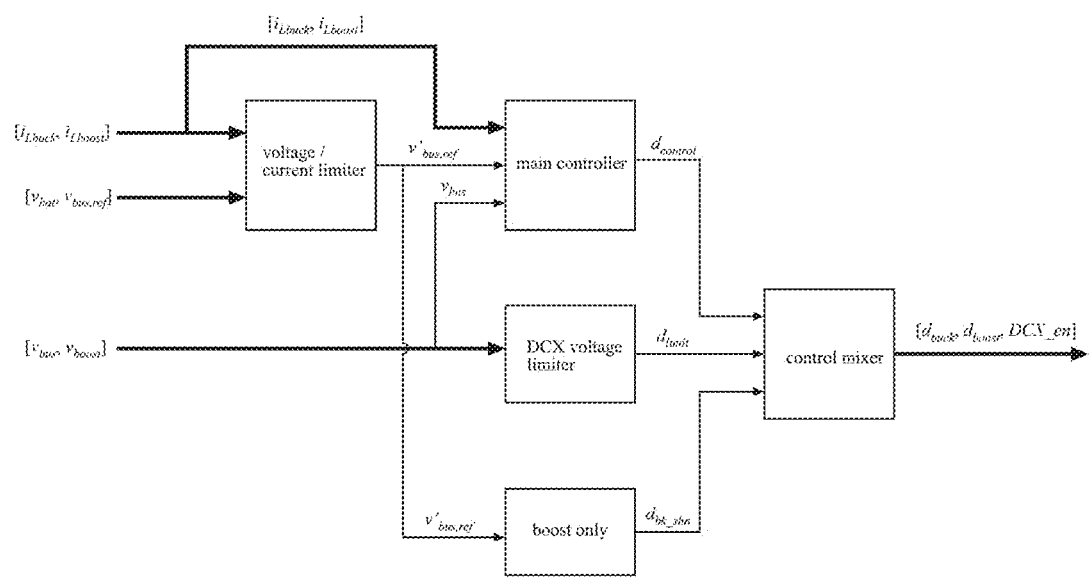
FIG. 16 illustrates top-level blocks of an example implementation of a modular boost dc-dc system controller.

FIG. 16 shows a block diagram of one implementation of a controller architecture 220 that illustrates how the module control signals are generated based on the sensed power-stage signals and the output voltage reference $v_{out,ref}$. The "voltage/current limiter" block limits adjusts the output voltage reference value so that it always stays within the expected range. Furthermore, the output voltage reference can be adjusted if a sensed steady-state inductor current is too high, thus providing an over-current protection function. Based on the sensed output voltage, the reference output voltage, and the sensed inductor currents, the "main controller" determines a single control variable called $d_{control}$. The main controller includes a dynamic response designed to ensure stability and well-behaved transient responses of the closed-loop controlled system. By design, the main control variable $d_{control}$ is between 0 and 2.

The purpose of the "DCX voltage limiter" is to ensure that the DCX output voltage stays below a set value $V_{Q,max}$. The output of the DCX voltage limiter is an auxiliary control variable $d_{limit}$, which is between 0 and 1.

The "boost only" block decides if the buck module should be turned on or not depending on the requested bus voltage. The "boost only" block outputs an auxiliary control variable $d_{bk\_shn}$, which is between 0 and 1.

The "control mixer" takes the main control variable $d_{control}$, and the two auxiliary control variables, $d_{limit}$ and $d_{bk\_shn}$, and determines the module control signals $d_{buck}$ (buck module duty cycle), $d_{boost}$ (boost module duty cycle) and DCX_en (DCX enable).

Figure 17:
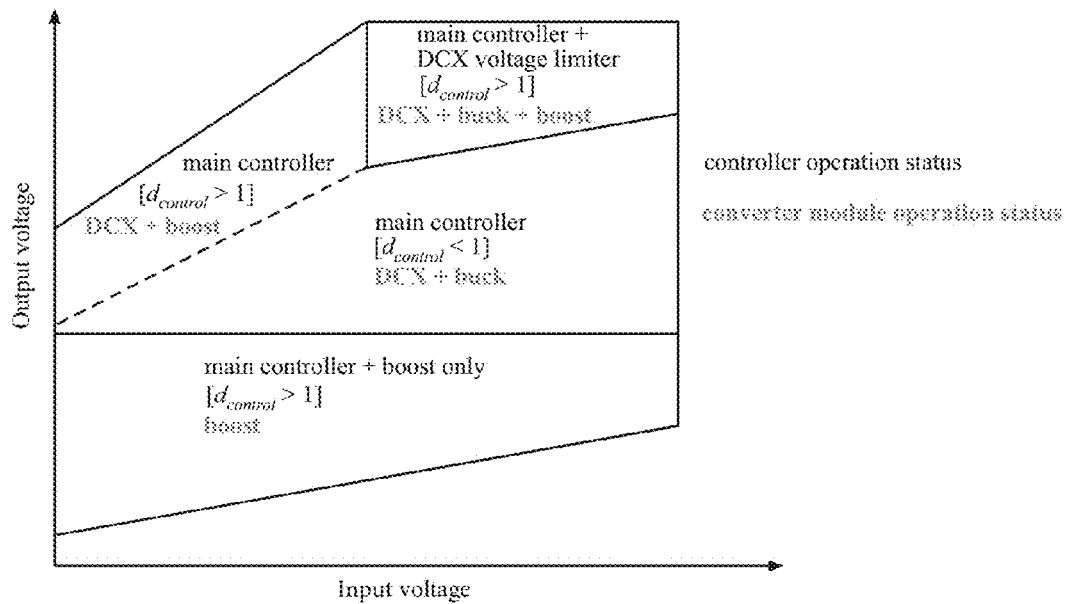
FIG. 17 shows an example relationship of a controller operating status to operating modes of a modular boost system.

FIG. 17 shows how the controller operating status is related to the modular boost system operating mode. In the Boost mode, the "boost only" block shuts down the buck and the DCX modules, and the voltage regulation loop is closed through the main controller. In the DCX+Buck+Boost mode, the "DCX voltage limiter" block regulates the DCX output to $V_{Q,max}$, and the "main controller" regulates the output voltage. In the DCX+Buck or DCX+Boost modes, the "main controller" regulates the output voltage. The value of the main control variable $d_{control}$ decides if the system is in the DCX+boost mode ($1<d_{control}<2$), or in the DCX+buck mode ($0<d_{control}<1$).

Figure 18:
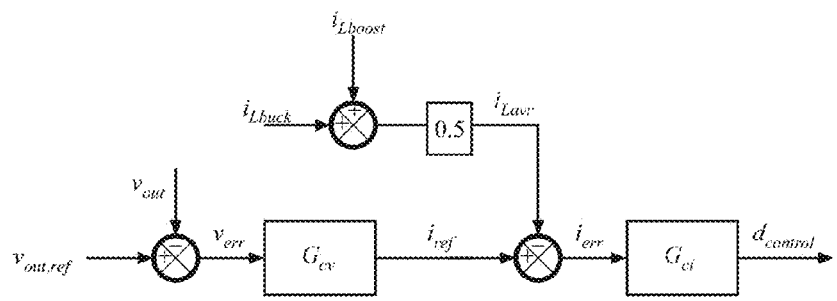
FIG. 18 is a detailed block diagram of an example main controller block, which implements average current control.

A more detailed block diagram of a "main controller" 230 is shown in FIG. 18. This is a standard average current mode control with an outer voltage loop including the voltage-loop compensator $G_{cv}$ and an inner current loop including the current-loop compensator $G_{ci}$. The inner current loop is setup to regulate the average of the buck and the boost inductor currents. The compensators $G_{ci}$ and $G_{cv}$ are simple proportional-plus-integral (PI) compensators. The range of $i_{ref}$ is limited so that the dynamic range of the average inductor current is limited. The main control variable $d_{control}$ is by design limited between 0 and 2.

Figure 19:
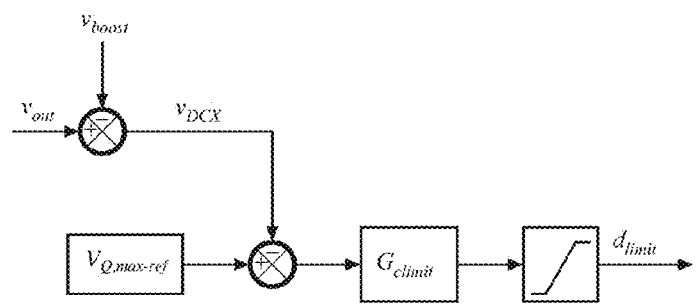
FIG. 19 is a detailed block diagram of an example DCX voltage limit block.

A more detailed block diagram of a "DCX voltage limit" block 240 is shown in FIG. 19. The DCX output voltage $v_{Dcx}$ is obtained by subtracting the sensed boost output voltage from the sensed output bus voltage. $v_{Dcx}$ is compared to a reference value of $V_{Q,max}$, denoted $V_{Q,max-ref}$ and the error is processed by $G_{climit}$, which is a proportional-plus-integral-plus-derivative (PID) compensator producing the auxiliary control variable $d_{limit}$, which is between 0 and 1. If the DCX output voltage is less than $V_{Q,max-ref}$, the auxiliary control variable $d_{limit}$ saturates to 1. If the DCX output exceeds 400 V (which may occur in the DCX+Buck+Boost mode), the auxiliary control variable $d_{limit}$ becomes less than 1.

A "boost only" block is implemented as an up/down counter. When the requested output voltage reference is greater than $V_{Q,max-ref}$ it counts down from 1 to 0; when the requested output voltage is less than $V_{Q,max-ref}$ it counts up from 0 to 1.

Figure 20:
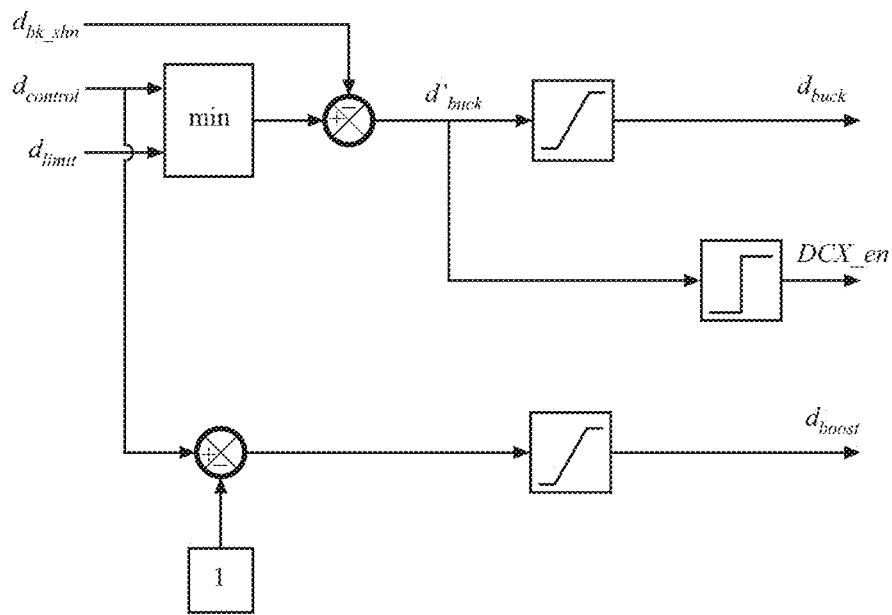
FIG. 20 is a detailed block diagram of an example control mixer block.

A detailed design of a "control mixer" block 250 is shown in FIG. 20. The buck module control variable (duty cycle $d_{buck}$) is obtained by:
1. Taking the minimum of $d_{control}$ and $d_{limit}$;
2. Subtracting $d_{bk\_shn}$ to get $d'_{buck}$;
3. Limiting the final $d_{buck}$ between 0 and 1

If the DCX output is greater than $V_{Q,max-ref}$ then $d_{limit}$ drops to a value smaller than $d_{control}$, so that $d_{buck}$ is determined by $d_{limit}$. In this case, the buck module is effectively controlled to limit the DCX output voltage to $V_{Q,max-ref}$. If the DCX output voltage is less than $V_{Q,max-ref}$ then $d_{limit}=1$. In this case, if $d_{control}<1$, $d_{buck}$ is determined by $d_{control}$, which means that the buck module regulates the system output voltage. This occurs in the DCX+Buck mode. If $d_{control}>1$, then $d_{buck}=1$, and the buck module is in the pass-through mode. This occurs in the DCX+Boost mode. If the requested bus voltage is less than $V_{Q,max-ref}$ then $d_{bk\_shn}$ gradually counts from 0 to 1, which ultimately leads to $d'_{buck} \le 0$, and the resulting $d_{bk}=0$ shuts down the buck module. This occurs in the Boost mode.

The DCX control signal $DCX_{en}$ shuts down the DCX module whenever $d'_{buck} \le 0$. The boost module control variable $d_{boost}$ obtained by passing $d_{control}-1$, through a 0 to 1 limiter. When $d_{control}<1$, then $d_{boost}=0$, which means that the boost module in the pass-through mode. This occurs in the system DCX+buck model. Otherwise the boost module regulates the bus voltage.

Figure 21:
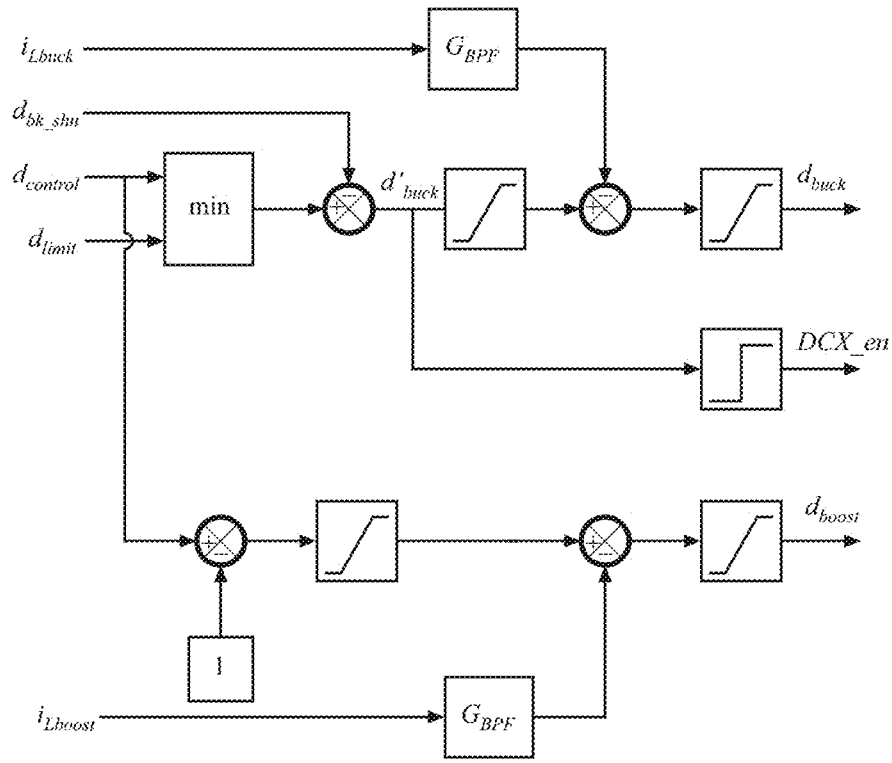
FIG. 21 is a detailed block diagram of an example control mixer block.

With the control approach described above, all mode-changing decisions are based on values of the main and the auxiliary control variables, and all mode transitions are smooth and occur according to the internal state of each controller block. However, with the "control mixer" design in FIG. 20, one potential problem is that when the buck or the boost module enters its pass-through or shut-down mode, the module is no longer controlled unless the input or the output voltage changes. As a result, upon transition to pass-through or shut-down mode the inductor current may ring at the power stage natural frequency. To address this issue, the sensed buck and the boost inductor currents can be added to the "control mixer" as shown in FIG. 21. The band-pass filters $G_{BPF}$ pass only the components of the sensed current around the natural frequency of the power stage. In response, the controller will respond to and suppress a ringing disturbance in the corresponding inductor current.

Many implementations have been described with reference to the accompanying Figures. Various features introduced in particular implementations are also intended to be used in other implementations where appropriate. For example, while one or more features may be described with respect to one or more particular implementations, this is merely for convenience and is not intended to imply that those features are only contemplated to be used in that particular implementation.

Although many implementations have been described above with a certain degree of particularity, those skilled in the art could make numerous alterations to the disclosed embodiments without departing from the spirit or scope of this invention. The number and type of modules (e.g., DC-DC converter modules, DC transformer modules) in various implementations of a modular DC-DC converter could be varied as well as their arrangement within the modular DC-DC converter. For example, although the implementation of FIG. 6B describes a boost modular DC-DC converter, the implementation is not limited to just boos configurations. Any other DC-DC converter module capable of operating in a pass-through mode may be used instead of another particular DC-DC converter module. Similarly, various DC transformer modules may be used instead of the particular DC transformer modules described herein.

All directional references (e.g., upper, lower, upward, downward, left, right, leftward, rightward, top, bottom, above, below, vertical, horizontal, clockwise, and counterclockwise) are only used for identification purposes to aid the readerâĂŹs understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims It is also to be understood that the following claims are intended to cover all of the generic and specific features of the invention herein described and all statements of the scope of the invention which, as a matter of language, might be said to fall therebetween.

What is claimed:

1. A modular dc-dc converter system, comprising:
   a first dc-dc converter module, including a first converter module input port and a first converter module output port;
   a second dc-dc converter module, including a second converter module input port and a second converter module output port;
   a dc transformer module, including a transformer module input port and a transformer module output port;
   a controller that supplies at least one first duty cycle signal to at least one switch of the first dc-dc converter module, at least one second duty cycle signal to at least one switch of the second dc-dc converter module, and one or more control signals to the dc transformer module;
   a system input voltage port; and
   a system output voltage port,
   wherein the first converter module input port of the first dc-dc converter module and the second converter module input port of the second dc-dc converter module are coupled connected in parallel, and both the first dc-dc converter module and the second dc-dc converter module are coupled to the system input voltage port; the first converter module output port of the first dc-dc converter module is coupled to the transformer module input port of the dc transformer module; the second converter module output port of the second dc-dc converter module is coupled in series with the output port of the dc transformer module, and the series-coupled ports are coupled to the system output voltage port.

2. The apparatus of claim 1 wherein the controller is configured to command the first dc-dc converter module to operate in pass-through mode over a range of input and output voltages.

3. The apparatus of claim 1 wherein the controller is configured to command the second dc-dc converter module to operate in pass-through mode over a range of input and output voltages.

4. The apparatus of claim 1 wherein the controller comprises a microcontroller.

5. The apparatus of claim 1 wherein the transformer output port of the dc transformer module and the second converter module output port of the second dc-dc converter module share voltage stresses of the modular dc-dc converter system.

6. The apparatus of claim 1 wherein the dc transformer module comprises a zero-voltage switching dc-dc converter circuit.

7. The apparatus of claim 6 wherein the dc transformer module includes an inductive transformer.

8. The apparatus of claim 6 wherein the dc transformer module comprises isolated input and output terminals.

9. The apparatus of claim 1 wherein each of the first dc-dc converter module and the second dc-dc converter module comprises a hard-switched dc-dc converter module.

10. The apparatus of claim 1 wherein each of the first dc-dc converter module and the second dc-dc converter module comprise at least one of a buck dc-dc converter module, a boost dc-dc converter module and a non-inverting buck-boost dc-dc converter module.

11. A method of controlling a modular dc-dc converter system, the method comprising:
    providing a modular dc-dc converter system comprising: a first dc-dc converter module including a first converter input port and a first converter output port; a second dc-dc converter module including a second converter input port and a second converter output port; a dc transformer module including a transformer input port and a transformer output port; a controller that supplies at least one first duty cycle signal to at least one switch of the first converter module, at least one second duty cycle signal to at least one switch of the second converter module, and one or more control signals to the dc transformer module; a system input voltage port; and a system output voltage port, wherein the first converter input port of the first dc-dc converter module and the second converter input port of the second dc-dc converter module are coupled in parallel, both the first dc-dc converter module and the second dc-dc converter module are coupled to the system input voltage port; the first converter output port of the first dc-dc converter module is coupled to the transformer input port of the dc transformer module; the second converter output port of the second dc-dc converter module is coupled in series with the transformer output port of the dc transformer module, and the series-coupled ports are coupled to the system output voltage port; and
    in a first operational state, controlling the dc transformer module to shut down with dc transformer module output switches turned on and controlling the second dc-dc converter module to operate with PWM; and
    in a second operational state performing an operation comprising at least one of (i) controlling the first dc-dc converter module to operate in a pass-through mode, controlling the second dc-dc converter module to operate with pulse-width modulation (PWM) and controlling the dc transformer module with a fixed conversion ratio and (ii) controlling the second dc-dc converter module to operate in a pass-through mode and controlling the first dc-dc converter module to operate with PWM and controlling the dc transformer module with a fixed conversion ratio.

12. The method of claim 11 wherein, in a third operational state, in a third operational state, controlling the first dc-dc converter module and the second dc-dc converter module to operate with PWM, wherein the output voltage of the second dc-dc converter module is limited.

13. The method of claim 11 wherein, in a third operational state, controlling the first and second dc-dc converter modules to operate in a pass-through mode and controlling the dc transformer module with a fixed conversion ratio.

* * * * *